Dec. 16, 1941.    B. W. RAMSAY    2,266,475
METHOD OF SEPARATING AND RECOVERING MERCURY FROM
FINELY GROUND SUBSTANCES
Filed June 3, 1940    2 Sheets—Sheet 1

Inventor
by Bernard W. Ramsay
John E. E. Oatlack
Attorney

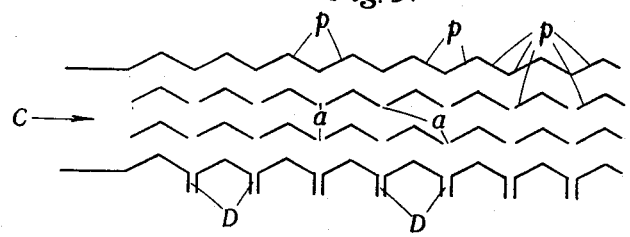
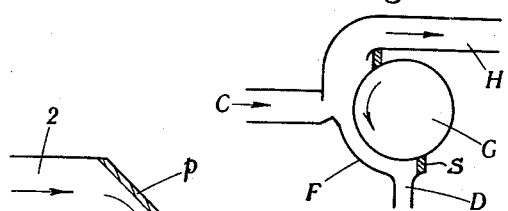
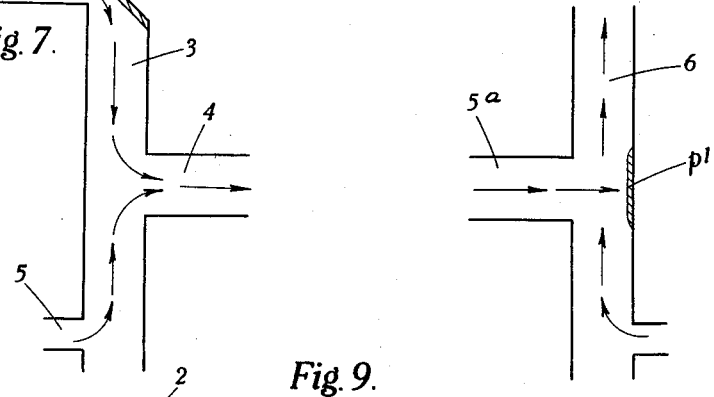
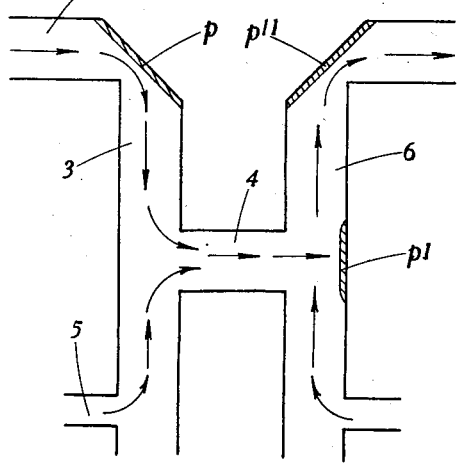

Patented Dec. 16, 1941

2,266,475

UNITED STATES PATENT OFFICE 2,266,475

METHOD OF SEPARATING AND RECOVERING MERCURY FROM FINELY GROUND SUBSTANCES

Bernard Walter Ramsay, Lambeth, London, England, assignor, by mesne assignments, to Pressure Amalgamation Incorporated, New York, N. Y., a corporation of Delaware Application June 3, 1940, Serial No. 338,610
In Great Britain August 8, 1938

7 Claims. (Cl. 75—81)

This invention relates to methods of effecting the separation and recovery of mercury from finely ground substances such as ores containing mineral particles and liquid mercury in the free form and has particular but not exclusive reference to the recovery of the mercury which passes over with the tailings from apparatus such as is used for the extraction of amalgamable metals (e. g. gold and silver) contained in ores. It is contemplated that such tailings will contain only particles sufficiently fine to pass through a 30 mesh sieve.

The chief object of the invention is to provide an improved method by which the separation of the mercury from finely ground substances, such as the tailings of an amalgamation process of the character referred to, may be completely or almost completely effected.

The invention consists in a method of effecting the separation of mercury from the ore or finely ground substance containing the mercury in the free form wherein the separation is effected by the employment of a current of air and by arranging one or more plates or other elements of amalgamable metal (e. g. silver) at a convenient point or points in or adjacent to the air stream so that the air carrying the ore or finely ground substance and the mercury is caused to strike the plate or plates or other element or elements.

The plate or plates or other elements of amalgamable metal is or are preferably arranged in the path traversed by the air stream carrying the ore or finely ground substances and the mercury so that the air after striking the plate or the like will be deflected, the arrangement being such that the particles of mercury will be deposited on or amalgamated with the material of the plate or the like until such time that the plate or the like is replaced by another or alternatively sufficient mercury has accumulated to form a drop which is sufficiently large to run off the plate or the like. Preferably, a series of plates or the like are arranged at various points along the path traversed by the current of air so that they are brought into action successively for the progressive extraction and recovery of the mercury.

Thus, it will be seen that by the process produced in accordance with the present invention small drops or particles of the mercury can be agglomerated until they attain dimensions of such a magnitude as will permit them to be subjected to further treatment as, for example, by air separation.

The apparatus used for carrying out the process may take various forms and, in order that the said invention may be clearly understood and readily carried into effect, the same will now be more fully described with reference to the accompanying drawings, in which:

Fig. 5 illustrates diagrammatically another arrangement which may be used with a horizontal air stream.

Fig. 6 illustrates diagrammatically an arrangement employing a rotary drum as the amalgamable element, and Figs. 7, 8 and 9 illustrate three further modes of carrying out the invention.

Figure 1:
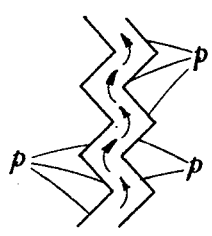
Figs. 1 and 2 illustrate diagrammatically modes of carrying out the invention employing an upwardly moving air stream.
Figure 2:
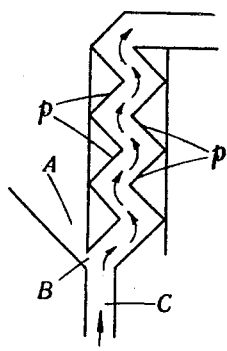

The invention is particularly applicable to the recovery of mercury which passes over with the tailings from an extraction apparatus (such as is described, for example, in British Specification No. 464,675) used for the extraction of amalgamable metals (e. g. gold and silver) contained in ores and in the preferred form is carried into effect by causing an air stream carrying the finely ground ore or impurities and the mercury to be directed against one or more plates of amalgamable metal, such as silver. In Fig. 1 of the accompanying drawings, there is shown diagrammatically one arrangement which may be used for the purpose in which an air stream carrying the ore or finely ground substances and the mercury is caused to move in an upward direction so that it encounters a series of obliquely disposed plates $p$ of amalgamable metal, the plates being, in this instance, arranged so that they define between them a zig-zag or sinuous path for the air stream of such a nature that the air and the particles carried thereby are caused to strike the plates and to be deflected thereby. By this arrangement the particles of mercury will be deposited on the plates or amalgamated with the material of the plates and this will continue until such time as the air stream is interrupted and the used plates replaced by fresh plates or alternatively sufficient mercury has accumulated to form one or more drops which are sufficiently large to run off the plates and be collected in suitable means provided for the purpose at the lower end of the space provided for the flow of the air stream. Fig. 2 illustrates one mode of using the arrangement shown in Fig. 1 in which A is a receptable into which the ore or finely divided material containing the mercury is fed so that after falling through a gap B, it encounters an upwardly directed air stream which enters the apparatus at C and which passes upwardly along a zig-zag path afforded by plates $p$ of the character above referred to. In the region of the gap B, a preliminary separation of the heavier of the mercury particles will take place but the lighter particles will be carried upwardly to strike the plates as above described. If desired, the arrangement shown in Fig. 1 or that shown in Fig. 2 may be modified to provide a plurality or a series of such spaces or zig-zag paths in parallel for the passage of the air stream.

Figure 3:
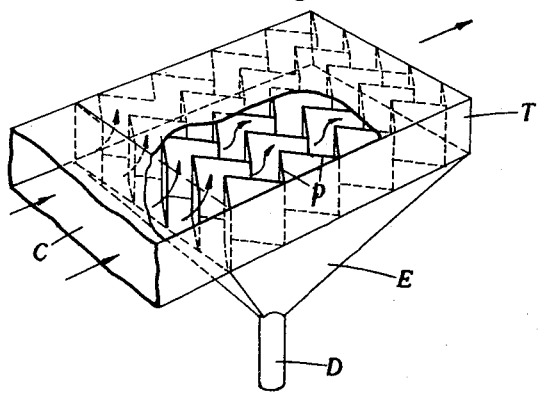
Fig. 3 illustrates diagrammatically one arrangement which may be used with a horizontal air stream.
Figure 4:
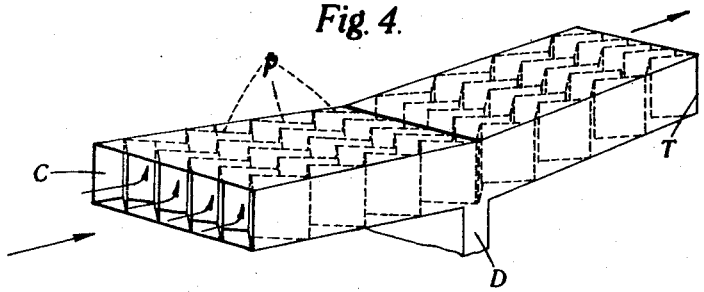
Fig. 4 is a modification of the arrangement shown in Fig. 3.

Fig. 3 illustrates another mode of carrying the invention into effect in which the air stream is caused to traverse a horizontal instead of a vertical path. In this arrangement, the air stream carrying the ore or finely ground material and mercury enters at C and is caused to move through a series of zig-zag spaces provided between a plurality of vertically disposed deflector plates $p$ arranged in position in a frame-like member T surmounting a pyramidal casing E provided at its lower end with an outlet or sorting column D for the recovered mercury. If desired, the pyramidal casing may be eliminated as, for example, by providing the part T with a sloping floor as is shown for example in Fig. 4. Alternatively, the plates instead of being disposed vertically or substantially so, may be arranged as is shown, for example, in Fig. 5 to provide a series of superposed zig-zag paths for the air stream. In this arrangement, suitable openings or gaps $a$ are provided between adjacent pairs of plates in order to permit the recovered mercury to pass from the upper plates to the sorting columns D.

According to another arrangement, the amalgamable surface is constituted by the surface of a rotary member or drum. For example, as shown in Fig. 6, the air stream carrying the finely divided particles and the mercury may enter a casing F at C so that it is caused to strike an amalgamable surface provided on a rotary drum G. The mercury collected on the surface may be obstructed during the rotation of the drum by a squeegee or the like S and, when drops of sufficient weight to fall from the drum are formed, collected from a sorting column D and the air stream may pass out through an outlet such as that shown at H. A plurality of these units may be employed in series if desired.

According to another mode of carrying the invention into effect, the air stream carrying the finely divided material and the mercury is caused to flow along a horizontally disposed conduit 2 (Fig. 7) which merges into a vertically disposed conduit 3 so arranged that at the junction of the two conduits there is provided an inclined plate member $p$ composed of silver or other metal which is "wetted" by mercury, the said plate preferably forming a constriction in the passage available for the flow of the air. In this manner, the tailings and the mercury are caused to strike the plate and the air current is diverted downwardly. Also, the small drops or particles of mercury or a large number of them will be deposited on the plate and agglomerated. At a convenient point in the length of the downwardly extending conduit a lateral opening 4 is formed for the escape of the air and at the lower end of the conduit means is provided for collecting the agglomerated drops of mercury which fall from the plate or the like.

The aforesaid downwardly extending conduit is also preferably utilised for effecting the separation by air of the agglomerated mercury from the ore being carried over by the air current and, for this purpose, the downwardly extending conduit is preferably provided near its lower end with an inlet 5 for a supplementary air current which can rise through the lower portion of said conduit and pass out with the main air current through the said lateral opening 4, the supplementary air current being regulated so that its velocity is sufficient to prevent particles of less than a predetermined size or weight from falling to the bottom of the vertically disposed conduit.

If desired, the lateral opening 4 may be connected with another horizontally disposed conduit provided with a second plate member. For example, a second horizontally disposed conduit 5a (Fig. 8) may be connected with a second vertically disposed conduit 6 and the second plate member $p'$ may be arranged in the second vertically disposed conduit opposite the end of the second horizontally disposed conduit. Also, the vertically disposed conduit 6 may, in some instances, be provided at its upper end with a further plate member such as that shown at $p''$ in Fig. 9 and at its lower end with means for delivering another supplementary upwardly directed air current thereto and, in fact, the arrangement can be continued to provide as many agglomerating and separating units as may be found necessary.

A supplementary air current preferably will be employed also in the arrangements shown in Figs. 3 to 6, wherein the supplementary current will be admitted through the columns D. This is necessarily true when the columns are open at their lower ends.

At the exit end of the last unit, means are preferably provided for removing the waste ore from the air stream.

The velocity of the air stream is maintained constant, and is determined by the fineness of the substances introduced thereinto. The only essentials are that it have a minimum lifting force sufficient to carry all the mineral particles past the amalgamable surfaces, and a maximum lifting force insufficient to overcome the force of gravity on the amalgamated drops of mercury that have separated from said surfaces, so that all the mineral particles will be delivered at the discharge end of the stream, and the separated drops may be collected in pure or completely segregated form as they fall from said surfaces. In order that the drops may fall from the surfaces, the force of gravity on the drops must overcome both the lifting force of the air stream and the surface tension tending to hold the drops to the surfaces, so, actually, only the minimum requirement is necessary since the combined restraining forces of the air stream and surface tension necessarily exceeds that of the air stream alone, but as a practical matter, a maximum limit is desirable to conserve power and minimize abrasion.

The proper velocity at which the air stream should be maintained may be readily ascertained by first adjusting the air pump which creates the air stream at a low speed so that the lifting force of the air stream will be insufficient to lift the coarser mineral particles introduced thereinto, then gradually increasing the speed of the pump until all such particles flow with the stream. After this preliminary determination, the velocity is maintain constant at the determined rate for efficient and economical operation of the process. Preferably, the largest of the mineral particles will pass through a 30 mesh sieve. Whether or not any mercury particles appear in the air stream of a weight sufficient to overcome the lifting force of the air is unimportant, since all such drops will be collected as they fall from the stream, and ultimately substantially all of the mercury will be concentrated into such drops by the action of the amalgamable surfaces. By maintaining the air velocity as above indicated, all of the mineral particles will be discharged at the leading end of the air stream, and the mercury collected along the length of the stream will be in a pure or completely segregated form.

It will be appreciated that the aforesaid plate members may be flat, curved, corrugated or crinkled and that, in some instances, they may be in the form of wire networks or the like. Also that, in the final stage or stages of the process, there may be provided one or more plates or the like on which mercury is not permitted to collect sufficiently to form drops, which plates may be continuously renewed and the mercury recovered therefrom by heating the same or alternatively a continuous band may be provided and arranged so that it is adapted to be moved into and out of contact with the air stream, a suitable scraping device or other means being provided externally of the units for the removal of the excess mercury.

Having thus described my said invention which I claim as new therein and desire to secure by Letters Patent is:

1. A continuous method of effecting separation and recovery of mercury from finely ground substances such as ores containing mineral particles and also liquid mercury in free form, consisting of introducing said substances into an air current, maintaining the velocity of the air current in such manner that all of said mineral particles will be entrained therein while conducting the air current past an amalgamable surface disposed in the path thereof whereby all of said mineral particles will be carried past said surface while the mercury contacting the surface will adhere thereto and form drops thereon, and continuously collecting the mercury in completely segregated form when the drops become sufficiently large to fall from said surface.

2. A method as claimed in claim 1 in which a series of surfaces is provided so that they are arranged at various points along the path traversed by the current of air and so that they are brought into action successively for the progressive extraction and recovery of the mercury.

3. A method as claimed in claim 1 in which a plurality of obliquely disposed plate members are provided and the current of air is caused to traverse a sinuous or zig-zag path provided thereby.

4. A method as claimed in claim 1 in which the current of air is directed upwardly through a column and the mercury is collected at the lower end of the column.

5. A method as claimed in claim 1 in which the current of air is directed horizontally and the mercury is permitted to fall into a sorting column disposed beneath the path traversed by the air stream.

6. A method as claimed in claim 1 in which a supplementary draft of air is employed for cooperation with said air current in the separation of the substances carried past said surface from the drops of mercury that fall from the surface.

7. A continuous method of effecting the separation and recovery of mercury from finely ground substances such as ores containing mineral particles and also liquid mercury in free form consisting of maintaining a controlled current of air through a duct so that the air comes in contact with amalgamable surfaces successively, continuously saturating the current of air with the finely ground substances to cause the mercury in such substances to adhere cumulatively to said surfaces in sufficient quantity to form drops sufficiently large to fall from the surfaces, admitting a supplementary draft of air to said duct beneath the surfaces for cooperation with said current of air in the separation of the falling drops of mercury from the finely ground substances carried past the surfaces, and continuously collecting the falling drops of mercury in completely segregated form.

BERNARD WALTER RAMSAY.